United States Patent Office 3,726,867
Patented Apr. 10, 1973

3,726,867
FOUNDRY PROCESS AND ARTICLES
PRODUCED THEREBY
Janis Robins, St. Paul, Minn., assignor to Ashland
Oil, Inc., Ashland, Ky.
No Drawing. Continuation of abandoned application Ser.
No. 756,419, Aug. 30, 1968, which is a continuation-in-part of application Ser. No. 569,106, Aug. 1, 1966, now Patent No. 3,429,848. This application Mar. 15, 1971, Ser. No. 124,569
Int. Cl. C08g 5/06
U.S. Cl. 260—30.4 N                    13 Claims

ABSTRACT OF THE DISCLOSURE

Shaped foundry articles are produced by a process in which a phenolic resin containing an ionic catalyst is admixed with a polyisocyanate and a foundry aggregate and then shaped and cured at room temperature.

RELATED APPLICATIONS

This application is a continuation of Ser. No. 756,419, filed Aug. 30, 1968, now abandoned, which in turn was a continuation-in-part of application Ser. No. 569,106, filed Aug. 1, 1966, now U.S. Pat. No. 3,429,848, issued Feb. 25, 1969.

The present invention relates to a process for making shaped foundry articles, to foundry aggregates employed in such process, and to articles obtained by such process.

In the foundry art, cores for use in making metal castings are normally prepared from mixtures of an aggregate material, such as sand, which has been combined with a binding amount of a polymerizable or curable binder. Frequently, minor amounts of other materials are also included in these mixtures, e.g. iron oxide, ground flax fibers, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surface of the pattern. Then by use of catalysts, e.g. chlorine and carbon dioxide, and/or the use of heat, the polymerizable binder is caused to polymerize, thereby converting the formed, uncured foundry sand mix into a hard, solid, cured state. This hardening can be accomplished in the original pattern, in a gassing chamber, or in the holding pattern. See U.S. Pats. 3,145,438 and 3,121,268, which patents are illustrative of the prior art techniques.

Phenolic resins constitute one of the well-known classes of curable resin compositions used as binders in the foundry art. Both the novolac type of phenol-aldehyde resin and the "resole" or "A-stage" resins have been used in this type of application. Novolac resins are soluble, fusible resins in which the polymer chains have phenolic end-groups. They are traditionally prepared by condensing phenols with aldehydes using acid catalysts and employing a molar excess of phenol over aldehyde. Novolac resins can be cured to insoluble, in fusible products by the addition of a source of formaldehyde such as hexamethylenetetramine or paraform. Resole and resitole resins, the latter being the more highly polymerized form of a resole resin, are generally prepared using an alkaline catalyst with excess aldehyde and result in polymers having a highly branched structure and therefore a high concentration of alkylol end-groups. Since each alkylol group constitutes a potential cross-linking site, the resole and resitole resins are readily converted to the cross-linked, infusible polymer by heating. The most commonly used monomers are phenol, i.e. hydroxybenzene and formaldehyde for both the resole type and the novolac type of resin. Although both the novolac resins and the resole resins have advantages and disadvantages characteristic of their different polymer structure in their application as foundry binders, both are subject to the deficiency of requiring heat in order to achieve the cured foundry form. Frequently, it is necessary to keep the green cores in the original molds or patterns during this heating period since many heat-curable binders do not impart sufficient green strength to cause green cores to retain their desired shapes without external support until such time as a final cure can be effected.

It is therefore an object of the present invention to provide a foundry process which provides for curing of shaped foundry mixes at room temperature.

It is another object of the present invention to provide shaped foundry cores and similar articles cured at room temperature which have superior properties in their intended application.

It is still another object of the present invention to provide foundry mixes, i.e. mixtures of foundry aggregates and binder, which can be cured at room temperature without further chemical treatment such as gassing.

Other objects will become apparent hereinafter.

Broadly described, the process of the present invention comprises forming a mixture of a phenolic resin containing an ionic catalyst, a polyisocyanate, preferably a solvent for both the phenolic resin system and the polyisocyanate, and a foundry aggregate, shaping the resulting mixture and curing the shaped mixture in a mold at room temperature.

Although it has been known heretofore that isocyanates react with phenolic resins to result in cross-linked materials, heating has generally been found to be necessary to result in cross-linked materials having acceptable properties. This has been particularly true where such mixtures of phenolic resins and polyisocyanates are employed in combination with a particulate solid such as a foundry aggregate. In the absence of heating, the shaped aggregates have low tensile strengths, cannot be readily removed from the mold, and are also deficient in other mechanical properties. These deficiencies are overcome in the process of the present invention by the use of an ionic catalyst and the choice of a suitable solvent system for the binder.

One aspect of the present invention is based on the fact that ionic catalysts as defined hereinafter, normally dissolved in the phenolic resin phase, catalyze its reaction with a polyisocyanate at room temperature if such ions exist in a non-aqueous environment. It appears that the ions, in order to function as the catalyst, must not only exist in the ionic state in the same phase as the phenolic resin, but furthermore that the ion, in order to function as the catalyst, must exist in an uncomplexed state. Since water is a strong complexing agent, and frequently found in phenolic resin compositions as a result of the methods by which the phenolic resins are produced, the substantial absence of water is emphasized as one criterion of distinguishing unacceptable phenolic resins from those suitable in the formation of the binders employed in the present invention. Water constitutes a catalyst poison which, when present in small concentrations, will reduce the desired activity of the ionic catalyst but which, if present in larger concentrations, can destroy the activity of the ion in accelerating the cross-linking reaction. The term "non-aqueous" or "in the substantial absence of water" is therefore meant to define resin systems, i.e. components or mixtures, which contain less than 5% and preferably less than 1% by weight of such component or mixture of the water. Increasing ion concentrations will proportionately increase the rate of cross-linking of the isocyanate with the phenolic resin. Thus, by adjusting the ion concentration, the phenolic resin can be cured within a few minutes to within about a day at normal or slightly elevated temperatures.

In addition to the catalytic activity of the ion in accelerating curing at room temperature, the structure of the phenolic resin employed in combinaion with the polyisocyanate greatly enhances the ability of the resin composition to cure at room temperature and more particularly to cure at room temperature in a manner which will result in superior mechanical properties in the cured product.

The binder compositions employed in the present invention are generally made available as a two-package system comprising the resin component in one package and the hardener component in the other package, said resin component comprising an organic solvent solution of a non-aqueous phenolic resin which also contains the ionic catalyst, the said hardener component comprising a liquid polyisocyanate having at least two isocyanate groups per molecule. At the time of use, the contents of the two packages are combined and used in the intended application. In foundry applications, it is furthermore feasible to first admix one component with the foundry aggregate, such as sand, and thereafter to add the second component and admix it with the resulting mixture. After a uniform distribution of the binder on such as the sand particles in the foundry application has been obtained, the resulting foundry mix is molded into the desired shape. The shaped product can be immediately removed from the mold and on standing at room temperature will form a cured product. In general, the time required for curing will vary inversely with the concentration of the ionic catalyst. Although the resin compositions of the present invention are particularly designed to achieve curing at room temperature, it is to be understood that these resin compositions can also be cured by baking at elevated temperatures.

Any phenolic resin which is substantially free of water and is soluble in an organic solvent can be used as a component of the binder composition employed in the process of the present invention. The term "phenolic resin" as employed herein is mean to define any polymeric condensation product obtained by the reaction of a phenol with an aldehyde. The phenols employed in the formation of the phenolic resin are generally all phenols which have heretofore been employed in the formation of phenolic resins and which are not substituted at either the two ortho-positions or at one ortho- and the para-position, such unsubstituted positions being necessary for the polymerization reaction. Any one, all or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl-substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms.

Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the general formula:

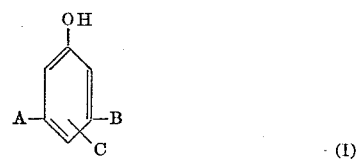

(I)

wherein A, B, and C are hydrogen, hydrocarbon radicals, oxyhydrocarbon radicals, or halogen. The preferred phenols are those which are unsubstituted in the para-position as well as in the ortho-positions. The most preferred phenol is the unsubstituted phenol, i.e. hydroxybenzene.

The aldehydes reacted with the phenol can include any of the aldehydes heretofore employed in the formation of phenolic resins, such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resins used as a component of the binder compositions employed in the process of the present invention can be either resole or A-stage resins or novolac resins. The resitole or B-stage resins, which are a more highly polymerized form of resole resins, are generally unsuitable. The phenolic resin employed must be liquid or organic solvent-soluble. Solubility in organic solvent is desirable to achieve the uniform distribution of the binder on the aggregate.

The term "non-aqueous" or "substantially water-free" as employed herein is meant to define a phenolic resin which contains less than 5% of water and preferably less than 1% of water based on the weight of the resin.

In general, novoloc resins are preferred over resole resins as the phenolic resin component of the binder used in the process of the present invention. Many resole resins are difficulty soluble in organic solvents and thus do not permit a uniform coating of the aggregate particles. Furthermore, resole resins are generally prepared in aqueous media and even on dehydration contain 10 or more percent of water. Novolac resins generally have a more linear structure and thus are more readily soluble in organic solvents. Because of their higher molecular weight and absence of methylol groups, novolac resins can, furthermore, be more completely dehydrated. The preferred novolac resins are those in which the phenol is prevailingly polymerized through the two ortho-positions. The preparation of novolac resins is known in the art and for that reason not specifically referred to herein.

Particularly preferred phenolic resins are condensation products of a phenol having the general formula:

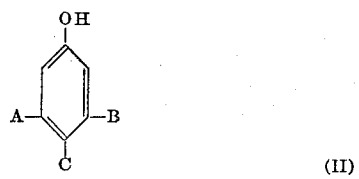

(II)

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in copending application Ser. No. 536,180, filed Mar. 14, 1966 (ADM-414). In the preferred form, these resins have the general formula:

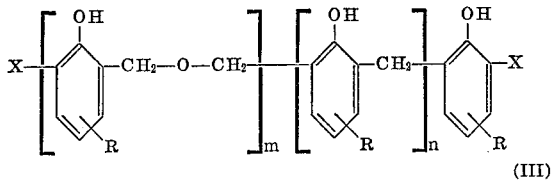

(III)

wherein R is a hydrogen or a phenolic substituent meta to the phenolic hydroxyl group, the sum of $m$ and $n$ is at least 2 and the ratio of $m$-to-$n$ is at least 1, and X is an end-group from the group consisting of hydrogen and methylol, the molar ratio of said methylol-to-hydrogen end-groups being at least 1.

The phenolic resin component of the binder composition is, an indicated above, generally employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentrations for the phenolic resins will vary depending on the type of phenolic resins employed and its molecular weight. In general, the solvent concentration will be in the range of 5 to 80% by weight of the resin solution and preferably in the range of 20 to 80%. It is preferred to keep the viscosity of the first component at less than $X'-1$ on the Gardner-Holdt scale.

The ionic catalyst employed to cause room temperature curing of the foundry mix is a metal ion and is generally added to the first component in the form of a metal salt or similar metal complex. By the term "salt" is meant a compound in which the metal is ionically bonded to the salt radical. It is believed that the catalytic action of the metal salt resides in the metal ion. The principal function of the salt radical is to dissolve the metal ion in the organic medium in which the phenolic resin is dissolved. Hence, the salt radical is selected such that the metal salt is soluble, which is defined for purposes of the present invention as being soluble in catalytic concentrations in the phenolic resin component at room temperature. In order to preserve the ionic nature of the salt, it is preferable that the anion of the salt is derived from an acid having a dissociation constant of greater than $1 \times 10^{-8}$. Preferred salt radicals are carboxylates of hydrocarbon acids. Other salt radicals include perchlorates and sulfonates.

The metal ion employed as the catalyst can be a monovalent, divalent, or trivalent metal ion, or even one having a higher valence state. The preferred metal ions include lead, calcium, zinc, tin, manganese, copper, and magnesium. The efficiency of the ionic catalyst will vary somewhat with each metal ion, some being more effective in catalyzing the reaction of the phenolic hydroxyl group with the polyisocyanate, while others are more effective in catalyzing the reaction of the methylol group with the polyisocyanate, and a third group being capable of catalyzing both reactions equally well. Examples of suitable catalysts are lead neodecanoate, zinc neodecanoate, lead naphthenate, manganese naphthenate, zinc naphthenate, calcium naphthenate, stannous octoate, zinc lactate, and dibutyl tin dilaurate. The particular activity of a metal ion can be established by reacting an isocyanate with saligenin and determining the extent of the reaction at either the methylol group or at the phenolic hydroxyl group by infrared spectroscopy.

In view of the varying catalytic activity and varying catalytic effect desired, catalyst concentrations will vary widely. In general, the catalyst concentration is selected such that the curing time of the binder composition is from 2 to 24 hours. This is readily established for each particular metal salt and phenolic resin and, generally, falls in the range of 0.0001 to 10 percent by weight of the phenolic resin. It is to be recognized, however, that faster curing rates can be achieved by increasing the concentration of the metal ion to the point that substantially immediate cross-linking and curing occurs when the two components of the binder are admixed with each other. However, for the purpose of a foundry binder, this is not desirable because of the resulting short bench life, i.e. the time in which the aggregate is formable and moldable. Many of the phenolic resins which form suitable binder components are prepared using metal ion catalysts and contain metal ions in concentrations suitable to cause room temperature curing of the foundry mix. It may, however, be desirable to either add to or extract from the metal ion-containing phenolic resin component certain types or amounts of metal ion in order to achieve a desired curing rate. In phenolic resins not prepared by metal ion catalysis, the metal ion catalyst is added to the polymerized resin.

The second component or package of the binder employed in the foundry process of the present invention comprises an aliphatic, cycloaliphatic, or aromatic polyisocyanate having, preferably, from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of 5 to 80% by weight of the solution.

Although the solvent employed in combination with either the phenolic resin or the polyisocyanate or for both components does not enter, to any significant degree, into the reaction between the isocyanate and the phenolic resin, it does affect the ability of the described binder to cause room temperature curing of the foundry mix. Thus, the difference in the polarity between the polyisocyanate and the phenolic resin restricts the choice of solvents in which both components are compatible. Such compatibility is necessary to achieve complete reaction and curing of the binder in the foundry mix at room temperature. Additionally, the solvent, by reducing the viscosity of the binder, aids in the uniform distribution of the resin composition on the substrate or the particulate solid. Polar solvents of either the protic or aprotic type are good solvents for the phenolic resin, but have limited compatibility with the polyisocyanates.

Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene, naphthalene, and mixtures thereof. Preferred aromatic solvents are mixed solvents that have an aromatic content of at least 90% and a boiling point range of 280° to 450° F. The polar solvents should not be extremely polar such as to become incompatible with the aromatic solvent. Suitable slightly polar solvents which are compatible with aromatic solvents include, in particular, ester and ether solvents. Suitable more polar but less costly solvents are generally those which have been classified in the art as coupling solvents and include furfural, furfuryl alcohol, Cellosolve acetate, butyl Cellosolve, butyl carbitol, diacetone alcohol, and "Texanol."

As indicated above, the binder or its components are admixed with sand or a similar foundry aggregate to form the foundry mix. Methods of distributing the binder or its components on the aggregate particles are well-known to those skilled in the art. The foundry mix can, optionally, contain other ingredients such as iron oxide, ground flax fibers, wood cereals, pitch, refractory flours, and the like.

A valuable additive to the binder compositions of the present invention is a silane having the general formula:

wherein R' is a hydrocarbon radical and preferably an alkyl radical of 1 to 6 carbon atoms and R is an alkyl radical, an alkoxy-substituted alkyl radical or an alkylamino-substituted alkyl radical in which the alkyl groups have from 1 to 6 carbon atoms. The aforesaid silane, when employed in concentrations of 0.1 to 2% based on the phenolic binder and hardener, improves the adhesion of the phenolic binder to the foundry aggregate particle.

The aggregate, e.g. sand, is usually the major constituent and the binder portion constitutes a relatively minor amount, generally less than 10% and frequently within the range of 0.25 to about 5%, these figures being based on the weight of the aggregate. Although the sand employed is preferably dry sand, moisture of up to about 1 weight percent based on the weight of the sand can be tolerated. This is particularly true if the solvent employed is not water-miscible or if an excess of the polyisocyanate necessary for curing is employed, since such polyisocyanate will react with the water, thereby reducing the poisoning effect of the water on the metal ion. The resulting foundry mix is then molded into the desired core or shape using established procedures, whereupon it can be cured either slowly or rapidly on removal from the mold and standing at room temperature.

The present invention is further illustrated by the following examples in which, unless otherwise indicated, all parts are by weight and all percentages are weight percentages.

Examples 1 to 10

Foundry sand mixes were prepared by admixing 20 parts of the phenolic resins further identified below, 20 parts of butyl acetate, and the below-indicated amount of a mixture of di- and triphenylmethane, di- and triisocyanate commercially available as "Mondur MR" until uniform and thereafter admixing the resulting binder with 2,000 parts of silica sand until the binder was evenly distributed on the sand particles.

The resulting foundry sand mixes were then formed into standard AFS tensile test samples using the standard procedure. The resulting test samples were then cured by storage for 20 hours at 125° F.

The cured samples were then stored in either a dry atmosphere or in an atmosphere of 100% relative humidity for a period of two hours before the tensile strength was measured.

The following phenolic resins were employed.

Resin A: This resin was obtained by charging to a reflux system 720 g. paraformaldehyde 1014 g. of phenol, 15 g. of zinc naphthenate solution (8%), and 120 ml. of benzene. The system was heated to reflux (103° C. to 126° C.). After three hours, during which water and benzene were distilled off, 150 ml. of diethylene glycol dimethyl ether and 10 ml. of benzene were added. An additional 150 ml. of the ether were added after one further hour of refluxing. After five hours, 600 ml. of tetrahydrofuran were added to dilute the resin system. A total of 310 g. of water was distilled over. The resin and the solvent weighed 2520 g. and was found to be a benzylic ether resin corresponding to Formula III.

Resin B: The procedure employed for Resins A was repeated except that 15 g. of lead naphthenate solution (25%) instead of the zinc naphthenate solution was employed. The reflux was continued for six hours at a temperature of 105° to 125° C. without the addition of the ether. A total of 298 ml. of water was distilled over. To the resin was added 100 ml. of benzene during the reflux and 575 ml. of isopropanol at the end of the reflux. This resin was found to be a benzylic ether resin corresponding to Formula III but having a lower molecular weight than Resin A.

Resin C: This resin was obtained by charging 292 g. of phenol, 63 g. of paraform, 2 g. of zinc naphthenate, and 100 g. of toluene. The reaction mixture was refluxed at 258° to 266° F. for a period of 6.5 hours and then heated to 380° F. The resulting resin was a benzylic ether resin of the novolac type.

TABLE I

| Example | Resin | Isocyanate content (in parts) | Exposure | Tensile strength (in p.s.i.) |
|---|---|---|---|---|
| 1 | A | 20 | Dry | 175 |
| 2 | A | 20 | 100% R.H. | 115 |
| 3 | A | 10 | Dry | 235 |
| 4 | A | 10 | 100% R.H. | 90 |
| 5 | B | 20 | Dry | 185 |
| 6 | B | 20 | 100% R.H. | 170 |
| 7 | B | 10 | Dry | 175 |
| 8 | B | 10 | 100% R.H. | 150 |
| 9 | C | 20 | Dry | 170 |
| 10 | C | 20 | 100% R.H. | 125 |

Examples 11 to 15

The procedures of Examples 1 to 10 were repeated except that 1% of a silane having the formula:

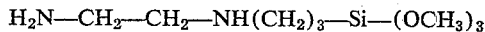

was added to the binder. The results obtained are shown in Table II.

TABLE II

| Example | Resin | Isocyanate content (in parts) | Exposure | Tensile strength (in p.s.i.) |
|---|---|---|---|---|
| 11 | B | 20 | Dry | 360 |
| 12 | B | 20 | 100% R.H. | 380 |
| 13 | B | 10 | Dry | 440 |
| 14 | B | 10 | 100% R.H. | 340 |
| 15 | B | 5 | Dry | 450 |

Examples 16 to 24

Into a sealed kettle was charged 62.5 lbs. of phenol, 466.5 lbs. of paraformaldehyde, 0.95 lb. of a 24% solution of lead naphthenate in toluene, and 4 lbs. of toluene. The vessel was sealed and heated to temperatures of 100° C. to 125° C. for a period of three hours. During this heating period, the pressure was maintained at 2 to 4 p.s.i., and steam released from the vessel as pressure increased. Some toluene distilled out with the steam. A total of 24 lbs. of water was removed. After three hours, a vacuum was pulled on the reaction mixture to remove all the toluene originally added, and 36.5 lbs.

of Cellosolve acetate was added to the 116 lbs. of resin obtained. The resin was of the benzylic ether type as defined in Formula III.

To parts of the resin solution were then added the catalysts in the amounts stated in Table III. The resulting resin solution was then admixed with 5,000 parts of Wedron silica sand until uniformly distributed and the amounts of solvent and polyisocyanate indicated in the table were added and distributed on the sand. The solvent employed was an aromatic solvent commercially available as "Solvesso-100" and the polyisocyanate was "Mondur MR."

The bench life of the foundry mix, i.e. the time between the forming of the mix and the degree of reaction which prevented the shaping of a coherent structure, was established.

The foundry mixes prepared were formed into standard AFS tensile test samples using the standard procedure. The tensile strengths of such samples were determined after standing at room temperature for 2, 4, and 24 hours, and after 16 hours at 125° F. (A.C.). The results obtained are listed in Table III.

50% aqueous sodium hydroxide until a water dilution end point of 350–400% is reached. The temperature is then reduced to 50, the pH adjusted with acetic acid to 7.0 to 7.2, and a vacuum is employed until the viscosity of the resole resin is 375 to 450 cps.

Resin G: An o–p novolac resin prepared by refluxing for about 2 hours a mixture of 100 parts of phenol, 61.5 parts of 37% aqueous formaldehyde, and 1.0 part of sulfonic acid. The resulting resin is then submitted to a vacuum at 140° to 145° C. until a Dennis Par Bar value of 165 to 170° F. and a Shrink Point value of 65 to 72° C. is reached.

Using the resins indicated above, the following results are obtained as shown in Table IV.

TABLE IV

| | Bench life (min.) | Strip time (min.) | Tensile strength after— | | | | | Hardness after— | | | | |
|---|---|---|---|---|---|---|---|---|---|---|---|---|
| | | | 2 hrs.* | 4 hrs.* | 52 hrs.* | 12 hours (desiccator) | 12 hours (100% R.H.) | 2 hrs.* | 4 hrs.* | 12 hrs.* | 12 hours (desiccator) | 12 hours (100% R.H.) |
| Resin D | 14 | 25 | 75 | 190 | 290 | 340 | 130 | 92 | 96 | 95 | 93 | 91 |
| Resin E | 8 | 16 | 40 | 135 | 200 | 280 | 30 | 90 | 92 | 93 | 93 | 80 |
| Resin F | 10 | >60 | 0 | | 200 | 180 | 35 | 0 | | 88 | 90 | 80 |
| Resin G | 18 | 24 | 165 | | 360 | 360 | 140 | 92 | | 93 | 96 | 88 |

*Ambient conditions.

The foregoing examples have illustrated the formation of the cores and shaped foundry products by the process of the present invention. Other polyisocyanates coming within the scope of the disclosure can be employed in place of the polyisocyanates specifically illustrated in the examples, and will give rise to similar results. It is therefore not intended to limit the scope of the present invention to the specific embodiments illustrated, since many

TABLE III

| Example | Catalyst | Catalyst (in pts.) | Resin solution (in pts.) | Polyisocyanate (in pts.) | Solvent (in parts) | Bench life (min.) | Tensile strength (in p.s.i.) after— | | | |
|---|---|---|---|---|---|---|---|---|---|---|
| | | | | | | | 2 hrs. | 4 hrs. | 24 hrs. | A.C. |
| 16 | Phenyl mercury acetate | 1.0 | 25 | 26 | 15 | 15 | 220 | 280 | 280 | 340 |
| 17 | Zinc naphthenate | 0.5 | 25 | 26 | 15 | 52 | 20 | | 150 | 200 |
| 18 | Lead naphthenate | 0.4 | 25 | 26 | 15 | 21 | 90 | 180 | 280 | 290 |
| 19 | do | 0.3 | 25 | 26 | 15 | 42 | 40 | 110 | 270 | 240 |
| 20 | Calcium naphthenate | 1.0 | 25 | 26 | 15 | 15 | 80 | 290 | 220 | 260 |
| 21 | Copper naphthenate | 0.5 | 25 | 26 | 15 | 18 | 70 | 170 | 280 | 260 |
| 22 | Stannous octoate | 0.4 | 25 | 26 | 15 | 25 | 70 | 150 | 160 | 270 |
| 23 | Manganese naphthenate | 1.3 | 25 | 26 | 15 | 34 | 70 | 190 | 190 | 300 |
| 24 | Dibutyl tin dilaurate | 0.4 | 25 | 26 | 15 | 25 | 100 | 220 | 200 | 220 |

Example 25

Foundry sand mixes are prepared by admixing 10,000 parts of sand with 100 parts of the novolac resins further identified below in 100 parts of cyclohexanone and distributing the resin solution on the sand and thereafter adding 100 parts of "Mondur MR" polyisocyanate as a 75% solution in "Solvesso-100" which solution also contained 1 part of lead naphthenate and forming a uniform mixture.

The bench life of the foundry mix and the strip time of a shaped form, i.e., the time required before a shaped form could be removed from the mold, are measured.

The resulting foundry mixes are formed into standard AFS tensile test samples using the standard procedure. The tensile strengths and hardness of test bars subjected to the below indicated curing cycles are measured.

The following resins are employed:

Resin D: A commercially available (Synco 2898C) acid catalyzed phenol formaldehyde, novolac-type resin.

Resin E: A resin prepared by refluxing at a temperature of 125° C. to 160° C. for a period of 3.5 hours a mixture of 2820 parts of phenol, 800 parts of paraformaldehyde, 5 parts of lead naphthenate, and 2.5 parts of lead oxide. A benzylic ether resin is obtained. The resulting resin is heated under vacuum at about 170° C. until 27 parts of water are removed. An o–o novolac resin is formed from the benzylic ether resin.

Resin F: A resole resin prepared by heating at a temperature of 70–80° C. a mixture of 100 parts phenol, 90 parts of 37% aqueous formaldehyde, and 1.5 parts of variations and modifications will be apparent to those skilled in the art.

I claim:

1. A foundry mix containing a foundry aggregate as the major constituent and up to 10% based on the weight of the aggregate of a binder solution comprising
(A) a phenolic resin containing less than 5% by weight of water based on said resin comprising a condensation product of a phenol having the general formula:

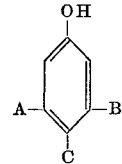

wherein A, B, and C are hydrogen, hydrocarbon radicals, oxyhydrocarbon radicals, or halogen; with formaldehyde; and catalytic concentrations of a metal ion;
(B) 10 to 500 weight percent based on said phenolic resin of a liquid polyisocyanate containing at least two isocyanate groups; and
(C) a solvent mixture for both said phenolic resin and said polyisocyanate comprising aromatic solvent and polar solvent, said solvent mixture comprising 5 to 80% by weight of the solution.

2. The foundry mix of claim 1 wherein A and B are hydrogen and C is a hydrocarbon radical.

3. The foundry mix of claim 1 wherein A, B and C are hydrogen.

4. The foundry mix of claim 1 wherein the phenolic resin is a novolac resin.

5. The foundry mix of claim 1 wherein the phenolic resin has the general formula

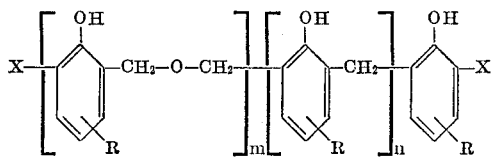

wherein

R is hydrogen or a phenolic substituent meta to the hydroxyl group of the phenol;

m and n are numbers the sum of which is at least 2, and the ratio of m-to-n is at least 1; and wherein X is a hydrogen or a methylol group, the molar ratio of said methylol group-to-hydrogen being at least 1.

6. The foundry mix of claim 5 wherein R is hydrogen.

7. The foundry mix of claim 1 wherein the polyisocyanate is an aromatic polyisocyanate.

8. The foundry mix of claim 1 wherein the metal ion is a lead, calcium, zinc, tin, manganese, copper, or magnesium ion.

9. The foundry mix of claim 1 wherein the polar solvent is furfural, furfuryl alcohol, Cellosolve acetate, butyl Cellosolve, butyl carbitol, diacetone alcohol, cyclohexanone, or mixtures thereof.

10. The foundry mix of claim 1 wherein the polyisocyanate is present in an amount of 20 to 300% by weight based on the phenolic resin.

11. The process of preparing shaped foundry products which comprises:

(a) forming a foundry mix by uniformly distributing on a foundry aggregate containing sand as the major constituent a binding amount of up to 10% based on the weight of the aggregate of a binder composition obtained by combining a phenolic resin, from 10 to 500% by weight of the phenolic resin of the liquid polyisocyanate and from 5 to 80% by weight of a resulting binder solution of a solvent, said phenolic resin polyisocyanate and solvent being as defined in claim 1;

(b) shaping the foundry mix in a mold; and (c) curing the shaped foundry mix at room temperature.

12. The process of claim 11 wherein the foundry mix is prepared by admixing the foundry aggregate with the phenolic resin component and thereafter admixing the resulting mixture with the polyisocyanate component.

13. The cured, shaped foundry mix of claim 11.

References Cited

UNITED STATES PATENTS

| | | | |
|---|---|---|---|
| 3,409,579 | 11/1968 | Robins | 260—30.4 |
| 3,429,848 | 2/1969 | Robins | 260—38 |
| 3,234,159 | 2/1966 | Cooper | 260—38 X |
| 3,432,457 | 3/1969 | Robins | 260—30.4 R |

OTHER REFERENCES

B. A. Dombrow: Polurethanes, 2d ed., Reinhold (1965), QD305.A2 D6, pp. 21-3.

MORRIS LIEBMAN, Primary Examiner

S. M. PERSON, Assistant Examiner

U.S. Cl. X.R.

164—43; 260—31.4 R, 32.8 N, 33.2 R, 33.4 UR, 38, DIG. 40

UNITED STATES PATENT OFFICE
CERTIFICATE OF CORRECTION

Patent No. 3,726,867　　　　　　　　Dated　April 10, 1973

Inventor(s)　Janis Robins

It is certified that error appears in the above-identified patent and that said Letters Patent are hereby corrected as shown below:

In Column 3, line 55; "mean" should be corrected to --meant--.

In Column 4, line 47; "difficulty" should be corrected to --difficultly--.

In Column 7, line 16; "Cellosolve" should be corrected to --cellosolve --.

In Column 7, line 17; "Cellosolve" should be corrected to --cellosolve--.

In Column 8, line 6; "466.5" should be corrected to --46.5--.

In Columns 9 & 10, line 41 "290" should be corrected to --190--.

In Columns 9 & 10, line 17 "52 hours" should be corrected to --12 hours--.

Signed and sealed this 8th day of October 1974.

(SEAL)
Attest:

McCOY M. GIBSON JR.
Attesting Officer

C. MARSHALL DANN
Commissioner of Patents